(12) United States Patent
Buchwitz et al.

(10) Patent No.: US 11,352,935 B2
(45) Date of Patent: Jun. 7, 2022

(54) EXHAUST SYSTEM FOR A VEHICLE

(71) Applicant: Polaris Industries Inc., Medina, MN (US)

(72) Inventors: James H. Buchwitz, Strathcona, MN (US); Derek D. Zimney, Roseau, MN (US); Darren J. Hedlund, Roseau, MN (US); Reed A. Hanson, Roseau, MN (US); Daniel E. Erickson, Labroquerie West (CA); Chad A. Dale, Roseau, MN (US)

(73) Assignee: Polaris Industries Inc., Medina, MN (US)

( * ) Notice: Subject to any disclaimer, the term of this patent is extended or adjusted under 35 U.S.C. 154(b) by 256 days.

(21) Appl. No.: 16/691,097

(22) Filed: Nov. 21, 2019

(65) Prior Publication Data

US 2020/0182123 A1   Jun. 11, 2020

Related U.S. Application Data

(60) Provisional application No. 62/776,689, filed on Dec. 7, 2018.

(51) Int. Cl.
*F01N 13/18*   (2010.01)
*F01N 1/02*    (2006.01)
(Continued)

(52) U.S. Cl.
CPC ........... *F01N 13/1855* (2013.01); *B62M 9/00* (2013.01); *B62M 27/02* (2013.01); *F01N 1/00* (2013.01); *F01N 1/02* (2013.01); *F01N 5/04* (2013.01); *F01N 13/08* (2013.01); *F01N 13/1805* (2013.01); *F02B 37/00* (2013.01); *B62M 2027/025* (2013.01); *B62M 2027/028* (2013.01); *F01N 2230/00* (2013.01); *F01N 2340/04* (2013.01); *F01N 2340/06* (2013.01)

(58) Field of Classification Search
CPC ..... F01N 1/00; F01N 1/02; F01N 5/04; F01N 13/08; F01N 13/1805; F01N 13/1855; F01N 2230/00; F01N 2340/04; F01N 2340/06; F02B 37/00; B62M 9/00; B62M 27/02; B62M 2027/025; B62M 2027/028
See application file for complete search history.

(56) References Cited

U.S. PATENT DOCUMENTS 3,614,259 A   10/1971  Neff
3,653,212 A    4/1972  Gast et al.
(Continued)

FOREIGN PATENT DOCUMENTS

CN   207648298 U  *  7/2018
JP      5001918 B2     8/2012

OTHER PUBLICATIONS

"Garrett by Honeywell", 2016, Honeywell, vol. 6 (Year: 2016).
(Continued)

*Primary Examiner* — Audrey B. Walter
(74) *Attorney, Agent, or Firm* — Harness, Dickey & Pierce, P.L.C.

(57) ABSTRACT

An exhaust system for a vehicle including a deep snow exhaust outlet defined by a driveline structural member of the vehicle. If the vehicle includes a turbo charger and an exhaust silencer, the turbocharger and the exhaust silencer are coupled together without exhaust piping therebetween.

18 Claims, 6 Drawing Sheets

(51) Int. Cl.
  *F02B 37/00* (2006.01)
  *B62M 9/00* (2006.01)
  *F01N 13/08* (2010.01)
  *B62M 27/02* (2006.01)
  *F01N 5/04* (2006.01)
  *F01N 1/00* (2006.01)

(56) References Cited

U.S. PATENT DOCUMENTS

| | | | |
|---|---|---|---|
| 3,703,937 A | 11/1972 | Tenney | |
| 3,870,115 A * | 3/1975 | Hase | B62M 27/02 |
| | | | 180/190 |
| 4,169,354 A | 10/1979 | Woollenweber | |
| 4,254,625 A | 3/1981 | Bergstedt et al. | |
| 4,289,094 A | 9/1981 | Tanahashi | |
| 5,051,909 A | 9/1991 | Gomez et al. | |
| 5,427,083 A | 6/1995 | Ahern | |
| 5,726,397 A | 3/1998 | Mukai et al. | |
| 6,073,447 A | 6/2000 | Kawakami et al. | |
| 6,158,214 A * | 12/2000 | Kempka | F01N 13/1888 |
| | | | 60/302 |
| 6,161,384 A | 12/2000 | Reinbold et al. | |
| 6,209,530 B1 | 4/2001 | Faletti et al. | |
| 6,435,169 B1 | 8/2002 | Vogt | |
| 6,739,579 B1 | 5/2004 | Rim | |
| 6,942,052 B1 * | 9/2005 | Blakely | B62M 29/00 |
| | | | 180/190 |
| 6,983,596 B2 | 1/2006 | Frankenstein et al. | |
| 7,017,706 B2 | 3/2006 | Brown et al. | |
| 7,794,213 B2 | 9/2010 | Gaude et al. | |
| 8,128,356 B2 | 3/2012 | Higashimori | |
| 8,483,932 B2 | 7/2013 | Pursifull | |
| 8,528,327 B2 | 9/2013 | Bucknell et al. | |
| 8,671,683 B2 | 3/2014 | Lilly | |
| 9,188,048 B2 * | 11/2015 | Bedard | F01N 13/082 |
| 9,322,323 B2 | 4/2016 | Panciroli | |
| 2001/0047656 A1 | 12/2001 | Maddock et al. | |
| 2002/0078934 A1 | 6/2002 | Hohkita et al. | |
| 2003/0029663 A1 * | 2/2003 | Etou | B62M 27/02 |
| | | | 180/312 |
| 2003/0236611 A1 | 12/2003 | James et al. | |
| 2006/0175107 A1 * | 8/2006 | Etou | B62M 27/02 |
| | | | 180/190 |
| 2007/0062188 A1 | 3/2007 | Fry et al. | |
| 2008/0264380 A1 | 10/2008 | Kang et al. | |
| 2008/0276906 A1 | 11/2008 | Thomas | |
| 2009/0276141 A1 | 11/2009 | Surnilla et al. | |
| 2010/0036585 A1 | 2/2010 | Scharfenberg | |
| 2010/0041287 A1 * | 2/2010 | Woods | B63H 21/32 |
| | | | 440/89 R |
| 2010/0243343 A1 * | 9/2010 | Rasmussen | B62M 27/02 |
| | | | 180/9.1 |
| 2010/0313418 A1 * | 12/2010 | St. Mary | F02B 37/00 |
| | | | 29/888.011 |
| 2011/0093182 A1 | 4/2011 | Weber et al. | |
| 2011/0186013 A1 | 8/2011 | Sasaki | |
| 2011/0296835 A1 | 12/2011 | Ebisu | |
| 2012/0018468 A1 | 1/2012 | Dunican, Sr. | |
| 2012/0060494 A1 | 3/2012 | Sato et al. | |
| 2012/0181468 A1 | 7/2012 | Telep et al. | |
| 2012/0285177 A1 * | 11/2012 | Swenson | F02M 26/08 |
| | | | 60/805 |
| 2012/0285427 A1 | 11/2012 | Hayman et al. | |
| 2012/0316756 A1 | 12/2012 | Tsuyuki | |
| 2013/0111900 A1 | 5/2013 | Hagner et al. | |
| 2014/0360178 A1 | 12/2014 | Wang | |
| 2014/0366815 A1 * | 12/2014 | Lu | F01P 5/06 |
| | | | 123/41.1 |
| 2015/0240707 A1 | 8/2015 | Wang et al. | |
| 2016/0010541 A1 | 1/2016 | Wang et al. | |
| 2016/0040566 A1 * | 2/2016 | Barole | F01N 13/1816 |
| | | | 181/207 |
| 2017/0016407 A1 | 1/2017 | Whitney et al. | |
| 2017/0051684 A1 | 2/2017 | Lahti et al. | |
| 2017/0058760 A1 | 3/2017 | Shor | |
| 2018/0051622 A1 | 2/2018 | Liu et al. | |
| 2019/0063304 A1 | 2/2019 | Lefebvre et al. | |
| 2019/0136754 A1 | 5/2019 | Brin et al. | |

OTHER PUBLICATIONS

Office Action dated Mar. 9, 2021 in counterpart Canadian App. No. 3,063,162.
Office Action issued in corresponding Canadian Application No. 3,063,162 dated Aug. 20, 2021 (4 pages).

* cited by examiner

EXHAUST SYSTEM FOR A VEHICLE

CROSS-REFERENCE TO RELATED APPLICATION

This application claims the benefit of U.S. Provisional Application No. 62/776,689 filed on Dec. 7, 2018, the entire disclosure of which is incorporated herein by reference.

FIELD

The present disclosure relates to an exhaust system for a vehicle, such as a snowmobile or snow bike for example.

BACKGROUND

This section provides background information related to the present disclosure, which is not necessarily prior art.

Snowmobiles often use a deep snow exhaust to prevent snow from blocking the exhaust outlet. While such systems are suitable for their intended use, they are subject to improvement. For example, with current deep snow exhaust systems the exhaust outlet is moved from the lower bodywork of the snowmobile to within the periphery of the endless drive track, via the foot-well of the snowmobile where an operator would typically place his/her foot (such as his/her right foot) in a stirrup. As a result, the foot-well is generally rendered unusable.

Furthermore, for snowmobiles equipped with a turbocharger, the turbocharger is typically spaced apart from the silencer and connected thereto through various exhaust piping, which undesirably increases pressure drop, decreases flow through the entire exhaust system, increases the overall complexity of the exhaust system, and increases cost.

The present disclosure advantageously includes an improved exhaust system that overcomes these issues in the art. The system of the present disclosure includes numerous additional advantages as explained herein and as one skilled in the art will recognize.

SUMMARY

This section provides a general summary of the disclosure, and is not a comprehensive disclosure of its full scope or all of its features.

The present disclosure includes an exhaust system for a snowmobile including a turbocharger assembly and an exhaust silencer. The turbocharger assembly and the exhaust silencer are coupled together without exhaust piping therebetween.

The present disclosure is also directed to a deep snow exhaust outlet defined by a driveline structural member of the snowmobile. A belt drive or chain drive assembly for propelling the snowmobile is supported by the driveline structural member.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of select embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
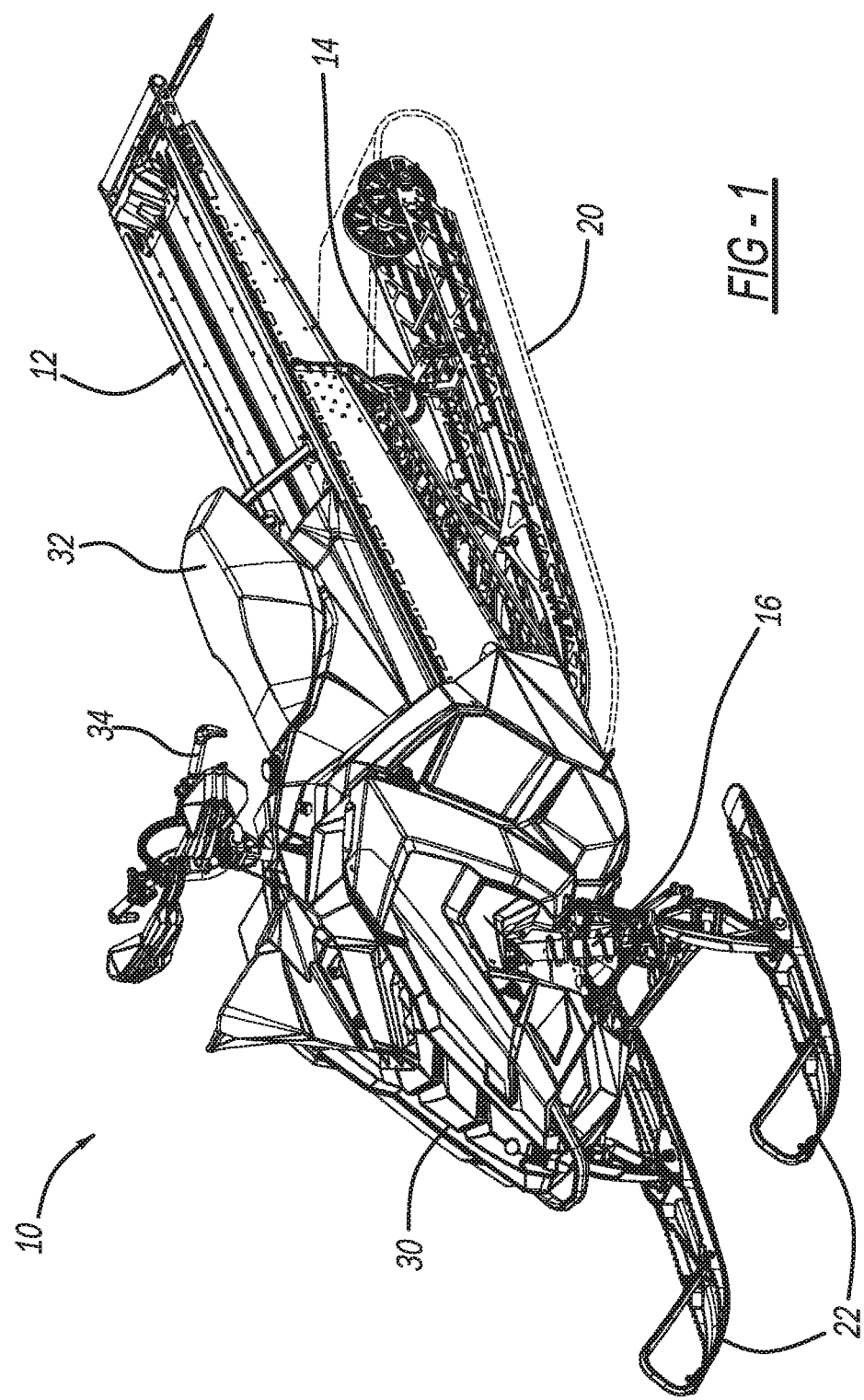
FIG. 1 is a perspective view of an exemplary snowmobile including an exhaust system in accordance with the present disclosure.

FIG. 1 illustrates an exemplary snowmobile 10 in accordance with the present disclosure. Although the present teachings are described as included with the exemplary snowmobile 10, the present teachings apply to any other suitable vehicle as well, such as any suitable vehicle with one or more snow skis, including a snow bike. Additional suitable vehicles include all-terrain vehicles, recreational vehicles, off-road vehicles, on-road vehicles, dirt bikes, watercraft, etc.

The snowmobile 10 generally includes a chassis 12, which is supported by a rear suspension 14 and a front suspension 16. The rear suspension 14 is connected to an endless belt 20, which propels the snowmobile 10. Connected to the front suspension 16 are snow skis 22. Under a hood 30 of the snowmobile 10 is an engine for driving the endless belt 20, such as the engine 110 of FIG. 4. An operator of the snowmobile 10 sits on a seat 32, and steers the snowmobile 10 with handlebars 34. The illustrated snowmobile 10 is provided for exemplary purposes only, and thus the present disclosure applies to any other suitable snowmobile. Furthermore, the present disclosure is applicable to any other suitable vehicle, as one skilled in the art will appreciate. Suitable vehicles include, but are not limited to, all-terrain vehicles (such as four-wheel vehicles, three-wheel vehicles, etc.), recreational vehicles, utility vehicles, etc.

Figure 2:
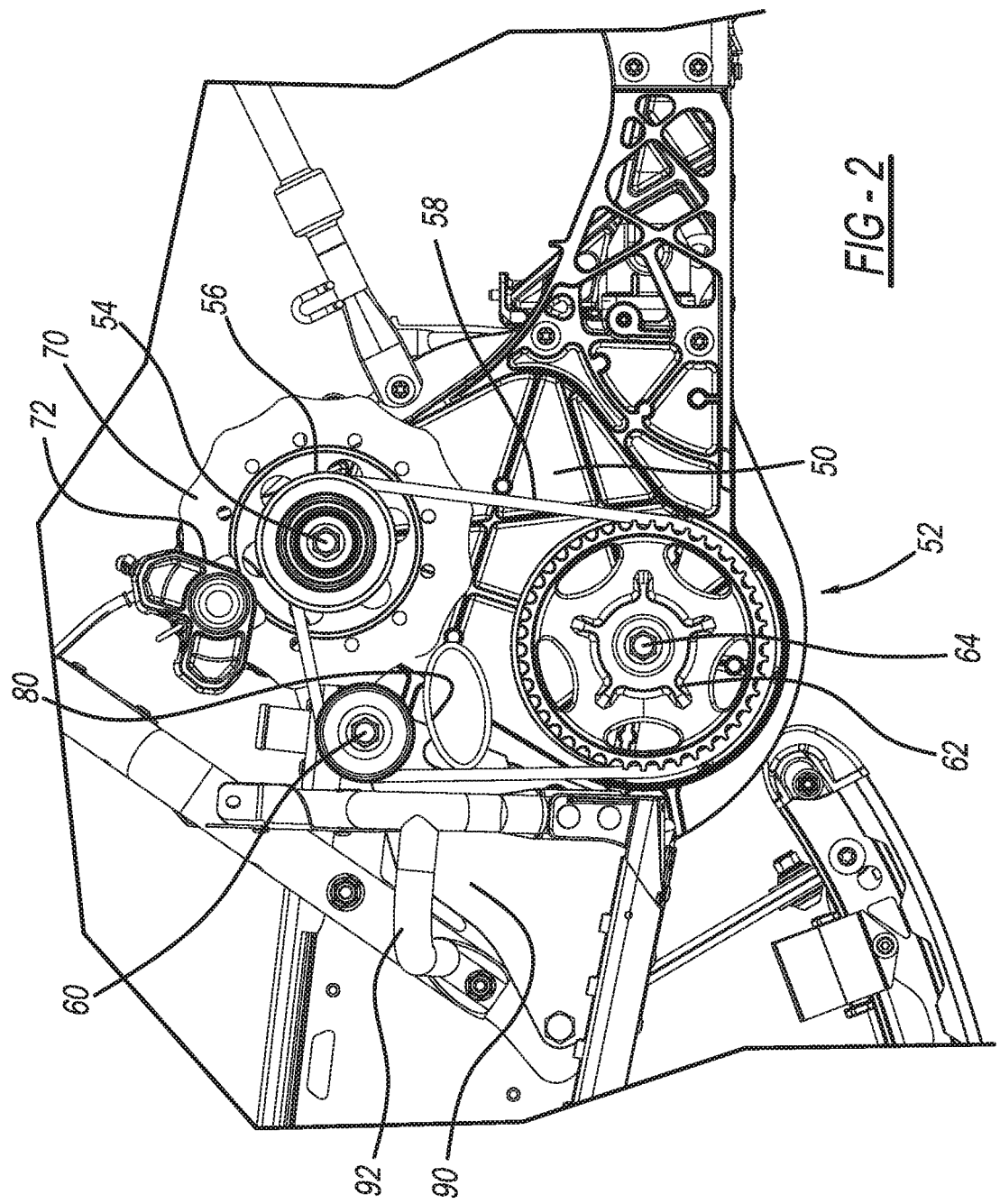
FIG. 2 is a side view of a driveline structural member of the snowmobile of FIG. 1 with a belt drive assembly mounted thereto.

FIG. 2 illustrates the chassis 12 in additional detail. The chassis 12 includes a driveline structural member 50. A drive belt assembly 52 is mounted to the driveline structural member 50. The drive belt assembly 52 is located forward of a foot-well 90 and stirrup 92. When operating the snowmobile 10, the operator has the option of placing his or her foot (e.g., right foot) in the foot-well 90 and the stirrup 92.

The drive belt assembly 52 includes a jackshaft 54 to which a drive pulley 56 is connected. A belt 58 is seated on the drive pulley 56, and extends over an idler pulley 60 to a driven pulley 62. The driven pulley 62 is mounted on a driveshaft 64. Also mounted to the jackshaft 54 is a brake disk 70, which can be engaged by a brake caliper 72. The engine 110 rotates the jackshaft 54, which results in the belt 58 rotating the driven pulley 62. The driven pulley 62 drives the endless belt 20 to propel the snowmobile 10.

Figure 3:
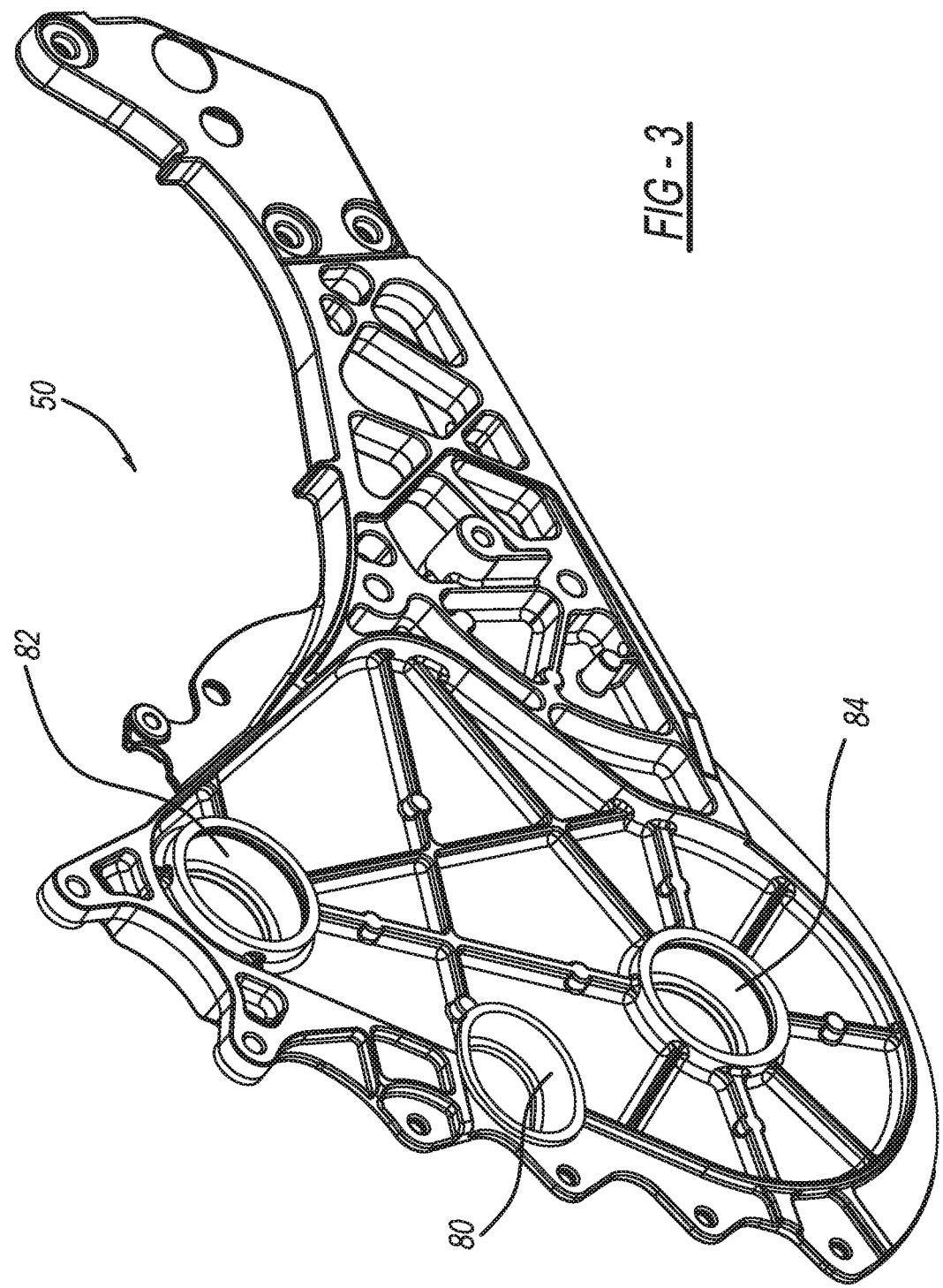
FIG. 3 is a perspective view of the driveline structural member without the belt drive assembly.

With continued reference to FIG. 2 and additional reference to FIG. 3, the driveline structural member 50 defines a deep snow exhaust outlet 80, an upper aperture 82, and a lower aperture 84. The driveline structural member 50 may be formed in any suitable manner. For example, the driveline structural member 50 may be a cast plate with the outlet 80, upper aperture 82, and lower aperture 84 cast therein. The jackshaft 54 extends through the upper aperture 82, and the driveshaft 64 extends through the lower aperture 84. Any suitable exhaust system is connected to the deep snow exhaust outlet 80, such as an exhaust outlet 126 of the exhaust system 120 described herein.

The deep snow exhaust outlet 80 is advantageously arranged in front of the foot-well 90 and the stirrup 92 (generally under the hood 30), in order to allow the operator to place his or her foot in the foot-well 90 and under the stirrup 92 without being encumbered by an exhaust outlet. This is an advantage over some current exhaust systems including a turbocharger, which place a deep snow exhaust outlet within the foot-well 90. The deep snow exhaust outlet 80 may be arranged at any suitable position on the driveline structural member 50 in front of the foot-well 90, such as within the belt 58 as illustrated in the example of FIG. 2.

Figure 4:
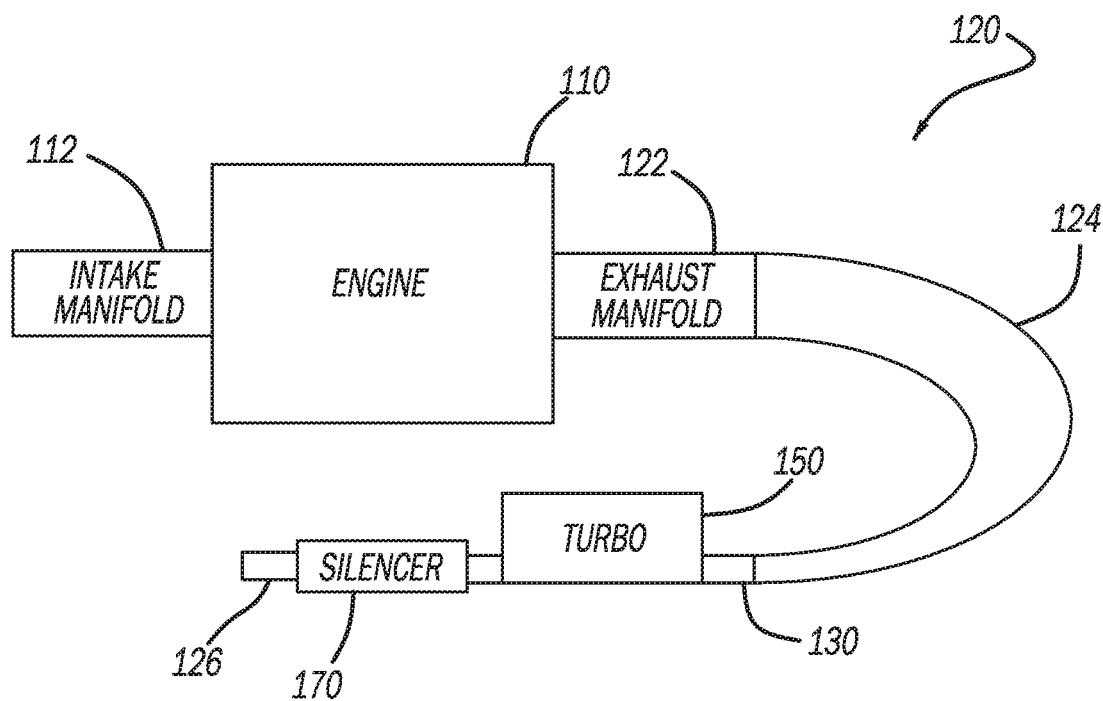
FIG. 4 illustrates an exemplary engine and exhaust system of the snowmobile of FIG. 1.

FIG. 4 illustrates the exemplary engine 110 and the exemplary exhaust system 120. The exhaust system 120 includes an exhaust manifold 122, an exhaust pipe (tuned pipe) 124, and an exhaust outlet 126. The manifold 122 is connected to the engine 110 to receive exhaust gas from the engine 110. The exhaust gas travels through the manifold 122 and the exhaust pipe 124 to a stinger 130. A silencer 170 is downstream of the turbocharger 150.

Figure 5:
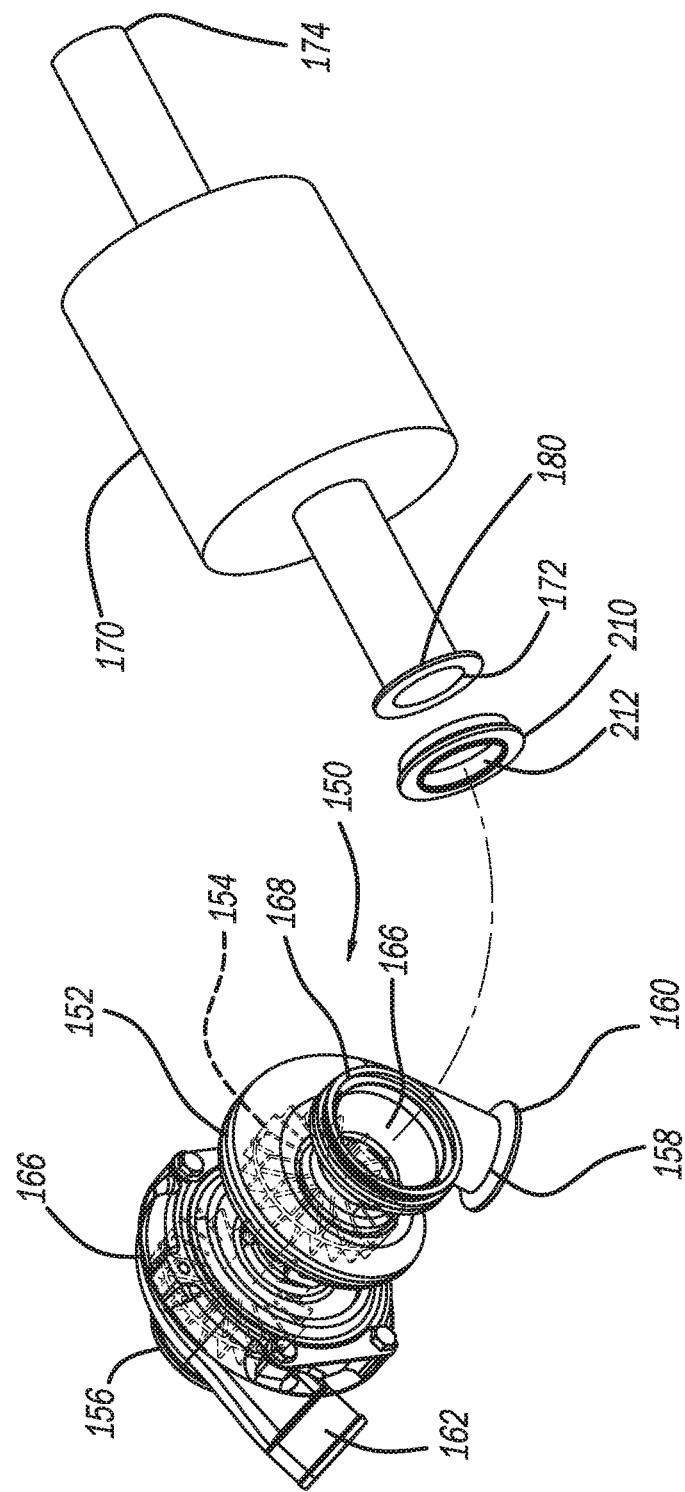
FIG. 5 is an exploded view of a turbocharger, a silencer, and an adapter flange of the exhaust system of the snowmobile, the turbocharger and silencer connected together by way of the adapter flange.
Figure 6:
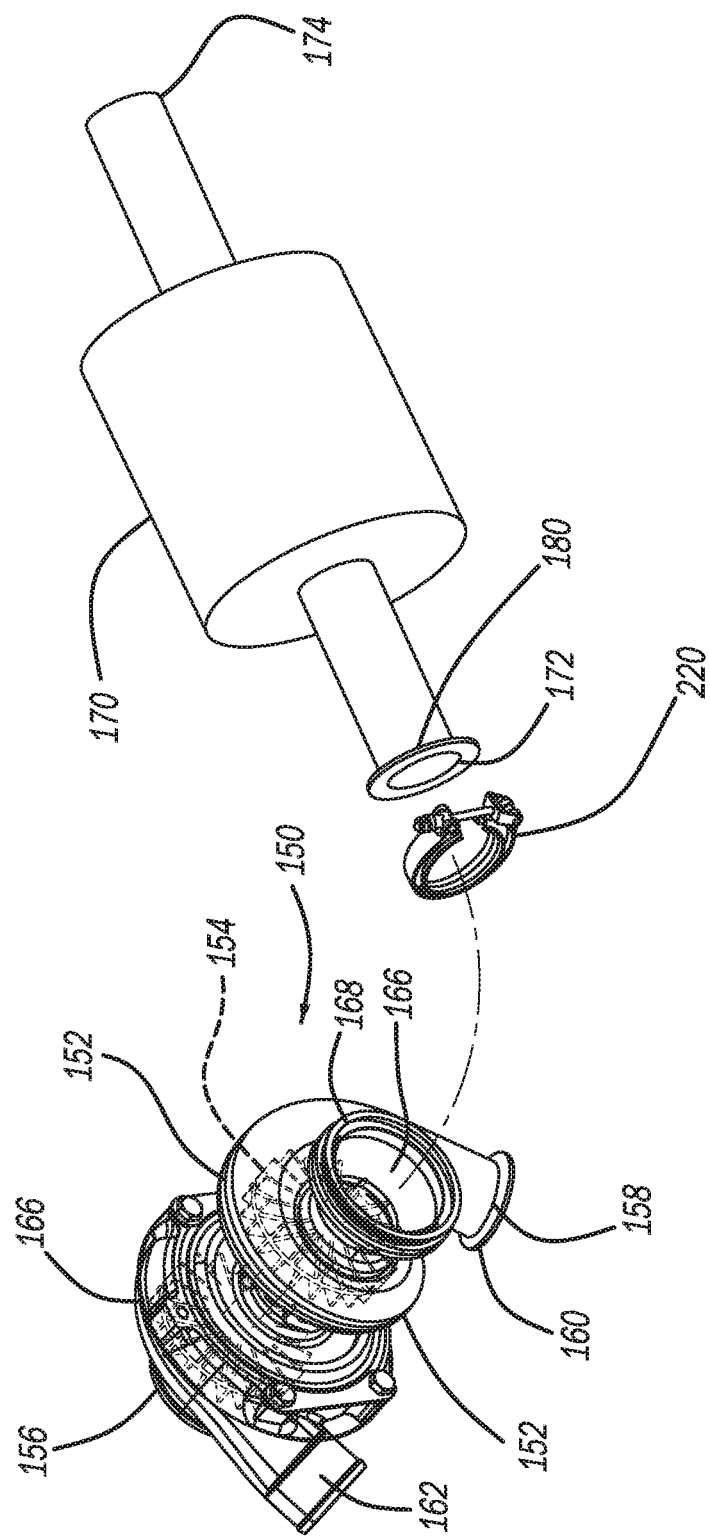
FIG. 6 illustrates the turbocharger and silencer of the exhaust system, as well as an exemplary flange and clamp arrangement for coupling the turbocharger and silencer together.

As illustrated in FIGS. 5 and 6, the turbocharger assembly 150 includes a turbine housing 152, which houses a turbine 154. Air enters the turbocharger 150 through a compressor inlet 156 of a compressor housing 166, and compressed air exits through a compressor outlet 162. Exhaust enters the turbine housing 152 through an exhaust inlet 158, which is connected to the stinger 130 of the exhaust pipe (tuned pipe) 124. Exhaust exits the turbine housing 152 through a turbine housing outlet 166. The turbocharger assembly 150 can be fully supported by the exhaust silencer 170 and/or by any suitable bracket.

At the turbine housing exhaust outlet 166 is a turbocharger connection interface 168. The turbocharger connection interface 168 can be any interface, such as any coupling interface, for coupling the turbocharger assembly 150 to the silencer 170 at an inlet 172 of the silencer 170. Thus, exhaust flows from the turbocharger 150 directly to the silencer 170 without any intermediate piping therebetween. The silencer 170 includes a silencer connection interface 180. The turbocharger connection interface 168 and the silencer connection interface 180 may be directly coupled together, or indirectly coupled together by way of any suitable adaptor and/or fastener, such as an adapter flange 210. Advantageously, the turbocharger 150 is connected to the silencer 170 without exhaust piping therebetween, which decreases pressure drop, increases flow through the entire exhaust system 120, decreases the overall complexity of the exhaust system 120, and decreases costs.

The adapter flange 210 defines an aperture 212. The adapter flange 210 is positioned such that the aperture 212 is aligned with the exhaust outlet 166 of the turbocharger assembly 150 and the inlet 172 of the silencer 170. Any suitable fastener(s), such as any suitable nut and bolt arrangement, can be placed in cooperation with the turbocharger connection interface 168, the adapter flange 210, and the silencer connection interface 180 to couple the turbocharger assembly 150 and the silencer 170 together. The silencer 170 includes the outlet pipe 174, through which exhaust exiting the silencer 170 flows. The outlet pipe 174 is connected to the deep snow exhaust outlet 80, through which exhaust ultimately exits the exhaust system 120.

FIG. 6 illustrates an alternate connector for coupling the turbocharger assembly 150 and the silencer 170 together, without any intermediate piping therebetween. In the example of FIG. 6, the coupling mechanism is in the form of a v-band clamp 220. The v-band clamp 220 may be any suitable coupling device for coupling the turbocharger connection interface 168 directly to the silencer connection interface 180. The v-band clamp 220 can be part of the exhaust silencer 120.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. An exhaust system for a vehicle comprising:
    a turbocharger assembly; and
    an exhaust silencer, the turbocharger assembly and the exhaust silencer are coupled together without exhaust piping therebetween;
    wherein the turbocharger assembly is fully supported by the exhaust silencer.

2. The exhaust system of claim 1, wherein the turbocharger assembly includes a turbine housing with a turbocharger turbine therein, the turbine housing is connected to the silencer without intermediary exhaust piping therebetween.

3. The exhaust system of claim 1, wherein the turbocharger assembly and the exhaust silencer are directly coupled together.

4. The exhaust system of claim 1, wherein the vehicle includes at least one snow ski.

5. The exhaust system of claim 1, wherein engine exhaust exiting the turbocharger assembly flows directly into the exhaust silencer without flowing through intermediary piping.

6. The exhaust system of claim 1, further comprising an adaptor flange connecting the turbocharger assembly and the exhaust silencer together.

7. The exhaust system of claim 6, wherein the adaptor flange is bolted to a turbine housing of the turbocharger assembly and to the exhaust silencer.

8. The exhaust system of claim 1, further comprising a v-band clamp directly connecting the turbocharger assembly and the exhaust silencer together.

9. The exhaust system of claim 8, wherein the v-band clamp is part of the exhaust silencer and a turbine housing of the turbocharger assembly is clamped to the v-band clamp.

10. The exhaust system of claim 8, wherein the v-band clamp is part of a turbine housing of the turbocharger assembly and the exhaust silencer is clamped to the v-band clamp.

11. The exhaust system of claim 1, wherein the vehicle is a snowmobile, the exhaust system further comprising a deep snow exhaust outlet defined by a driveline structural member of the snowmobile, a belt drive or chain drive assembly for propelling the snowmobile is mounted to the driveline structural member.

12. The exhaust system of claim 11, further comprising an exhaust conduit extending from the exhaust silencer to the deep snow exhaust outlet.

13. The exhaust system of claim 11, wherein:
    the deep snow exhaust outlet is entirely defined by the driveline structural member; and
    the driveline structural member is a single cast plate, a stamped plate, or a forged plate entirely defining the deep snow exhaust outlet.

14. An exhaust system for a vehicle having at least one snow ski comprising:
    a deep snow exhaust outlet defined by a driveline structural member of the vehicle;
    a belt drive or chain drive assembly for propelling the vehicle is mounted to the driveline structural member;
    a turbocharger assembly; and
    an exhaust silencer coupled to the turbocharger assembly without intermediary exhaust piping therebetween;
    wherein the turbocharger assembly is fully supported by the exhaust silencer.

15. The exhaust system of claim 14, wherein the driveline structural member is a single cast plate, a stamped plate, or a forged plate entirely defining the deep snow exhaust outlet.

16. The exhaust system of claim 14, wherein the deep snow exhaust outlet is inside a belt of the belt drive assembly.

17. The exhaust system of claim 14, wherein the deep snow exhaust outlet is forward of a foot-well of the vehicle.

18. The exhaust system of claim 14, further comprising an exhaust conduit extending from the exhaust silencer to the deep snow exhaust outlet.

* * * * *